(12) United States Patent
Frayret et al.

(10) Patent No.: US 12,398,471 B2
(45) Date of Patent: Aug. 26, 2025

(54) CHEMICAL POLISHING BATH FOR ALUMINUM AND ALUMINUM ALLOYS, AND METHOD USING SUCH A BATH

(71) Applicant: INSTITUT DE RECHERCHE TECHNOLOGIQUE MATÉRIAUX, MÉTALLURGIE, PROCÉDÉS, Metz (FR)

(72) Inventors: Jérôme Frayret, Le Triadou (FR); Joffrey Tardelli, Bertrange (FR); Loïc Exbrayat, Illkirch Graffenstaden (FR)

(73) Assignee: INSTITUT DE RECHERCHE TECHNOLOGIQUE MATÉRIAUX, MÉTALLURGIE, PROCÉDÉS, Metz (FR)

( * ) Notice: Subject to any disclaimer, the term of this patent is extended or adjusted under 35 U.S.C. 154(b) by 465 days.

(21) Appl. No.: 17/999,306

(22) PCT Filed: May 19, 2021

(86) PCT No.: PCT/EP2021/063294
§ 371 (c)(1),
(2) Date: Nov. 18, 2022

(87) PCT Pub. No.: WO2021/234001
PCT Pub. Date: Nov. 25, 2021

(65) Prior Publication Data
US 2023/0193476 A1    Jun. 22, 2023

(30) Foreign Application Priority Data
May 20, 2020 (FR) ...................................... 2005136

(51) Int. Cl.
*C23F 3/03*     (2006.01)
*B22F 10/62*    (2021.01)
(Continued)

(52) U.S. Cl.
CPC ................ *C23F 3/03* (2013.01); *B22F 10/62* (2021.01); *B33Y 40/20* (2020.01); *C09G 1/04* (2013.01);
(Continued)

(58) Field of Classification Search
None
See application file for complete search history.

(56) References Cited

U.S. PATENT DOCUMENTS

| 3,425,881 A | 2/1969 | Cohn |
| 4,530,735 A | 7/1985 | Whitehurst et al. |
| 2016/0073497 A1* | 3/2016 | Xu ..................... C23C 18/1608 427/532 |

FOREIGN PATENT DOCUMENTS

| CN | 106757039 B | 3/2019 |
| FR | 1093415 A | 5/1955 |

OTHER PUBLICATIONS

International Search Report issued Aug. 26, 2021 re: Application No. PCT/EP2021/063294, pp. 1-2, citing: CN 106757039 B, U.S. Pat. No. 4,530,735 A, FR 1093415 A.
(Continued)

*Primary Examiner* — Jiong-Ping Lu
(74) *Attorney, Agent, or Firm* — CANTOR COLBURN LLP

(57) ABSTRACT

A chemical polishing bath for polishing a part made of aluminum or of aluminum alloy, or a portion of such a part, which bath includes an oxidizing agent capable of attacking the aluminum, chosen from nitric acid, hydrogen peroxide, permanganate, or a mixture thereof, at a concentration between 1.2 and 3.0 mol/L. The polishing bath also includes a fluoride complexing agent capable of forming a complex with the oxidized aluminum, at a concentration between 0.3 and 1.6 mol/L; a catalyst (Cu); and phosphoric acid at a concentration between 10.10 and 14.30 mol/L and also
(Continued)

sulfuric acid at a concentration between 1.50 and 3.60 mol/L. The bath is particularly suitable for polishing parts resulting from additive manufacturing (3D printing).

22 Claims, 2 Drawing Sheets

(51) Int. Cl.
*B33Y 40/20* (2020.01)
*C09G 1/04* (2006.01)
*C23F 1/14* (2006.01)
*C23F 1/16* (2006.01)
*C23F 1/20* (2006.01)
C22C 1/04 (2023.01)

(52) U.S. Cl.
CPC .................. *C23F 1/14* (2013.01); *C23F 1/16* (2013.01); *C23F 1/20* (2013.01); *C22C 1/0416* (2013.01)

(56) References Cited

OTHER PUBLICATIONS

J. Herenguel et al., "Le polissage chimique de l'aluminum et de ses alliages" Revue De Metallurgie, 1951, vol. XLVIII, No. 4., pp. 1-5 (cited in Specification pp. 2-3).

L.R. Skubal et al., "Chemical polishing of aluminum coupons in support of vacuum chambers" Vacuum, Elsevier Ltd, Mar. 2, 2013, vol. 96, pp. 1-6.

\* cited by examiner

[Fig. 1]
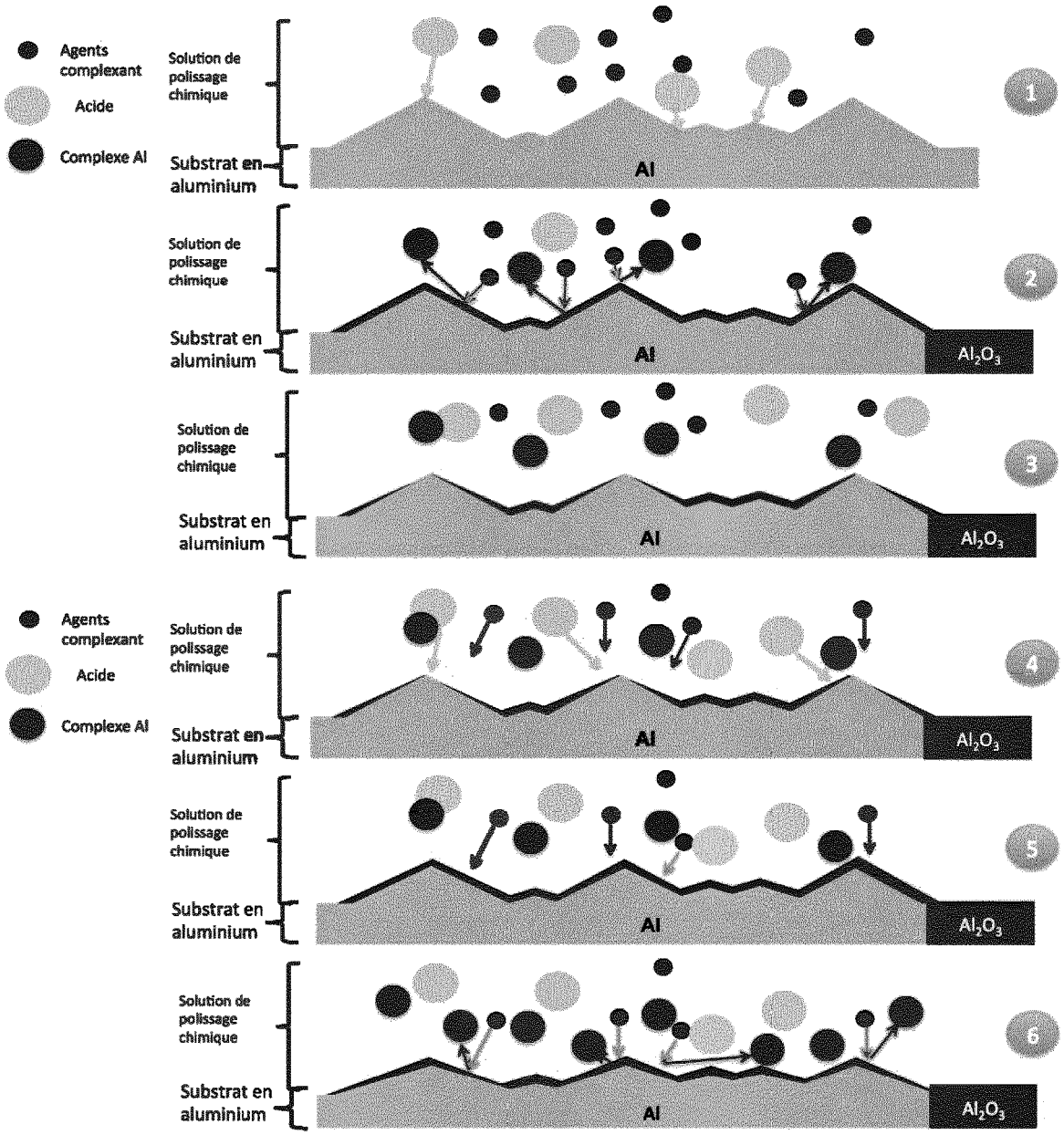

[Fig. 2]
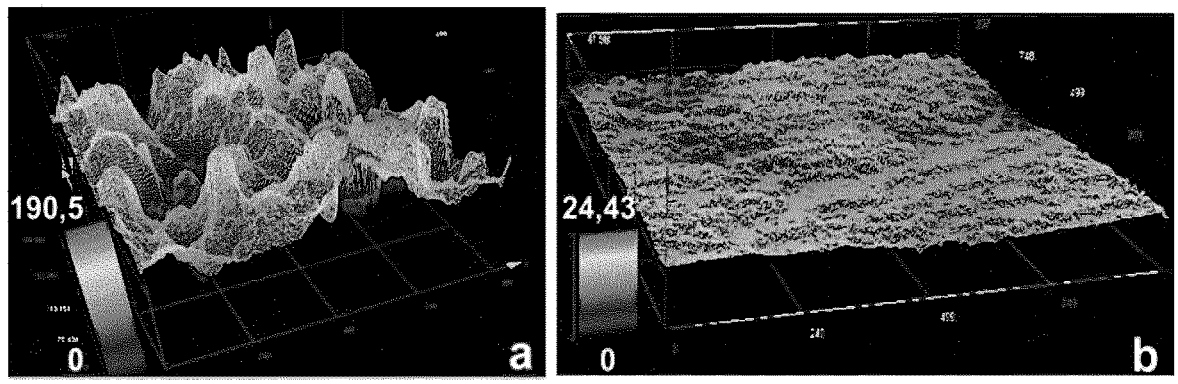
[Fig. 3]
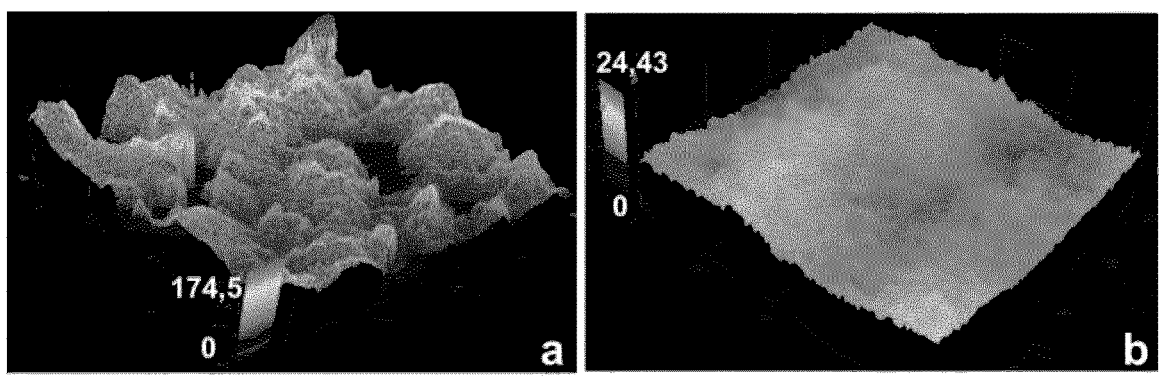

CHEMICAL POLISHING BATH FOR ALUMINUM AND ALUMINUM ALLOYS, AND METHOD USING SUCH A BATH

CROSS-REFERENCE TO RELATED APPLICATIONS

The present application is a 35 U.S.C. § 371 National Stage patent application of International patent application PCT/EP2021/063294, filed on 19 May 2021, which claims priority to French patent application 2005136, filed on 20 May 2020.

TECHNICAL FIELD

The present disclosure relates generally to the field of surface treatment of aluminum or aluminum alloy components, and in particular to the field of polishing aluminum or aluminum alloy components. The disclosure is particularly intended for polishing components produced by additive manufacturing.

BACKGROUND

Additive manufacturing or 3D printing, which enables the production of three-dimensional polymeric or metallic components from powders, constitutes a major focus of R&D in France and throughout the world. By successively fusing powders, additive manufacturing methods make it possible not only to produce components of complex geometry but also to contemplate the production of new alloy grades that are not obtainable by traditional metallurgical methods, while limiting the quantities of raw material required. Additive manufacturing is a technology of particular interest to the aerospace, automotive or shipbuilding industries from the viewpoint of improving the performance and reducing the weight of structures. However, "powder bed" additive manufacturing methods intrinsically lead to the creation of components, the final surface state of which bears traces of having being produced from powders with, in particular, surface roughnesses (expressed by the parameter Ra) of between 5 and 25 μm depending on the method used, namely substantially greater than the roughness of a machined component (of the order of several microns). Moreover, the components produced are generally characterized by the presence of partially melted particles on the outer surface which may become detached in service and so impair performance of these components (blocking of pipes, entrainment of particles into hydraulic systems, decrease in static and dynamic mechanical properties etc.).

It is therefore necessary not only to decrease the roughness of the components resulting from additive manufacturing, but also to eliminate surface irregularities and so prevent the risk of particles/foreign bodies becoming separated from the surface when in service, which could bring about functional problems in relation to the use of these components. Improving the surface state of the components produced may also allow improvement in certain aspects of performance in terms of fatigue strength and corrosion resistance, or indeed surface flow when it comes to hydraulic applications.

Currently, such a post-treatment step is a major technological obstacle with regard to the development of functional metallic components with controlled, reproducible characteristics resulting from additive manufacturing.

There are various polishing methods, such as electropolishing or plasma or laser polishing but these methods require the use of electrical current or indeed lasers, leading to high secondary costs. Furthermore, the use of lasers or working with high electric intensities require special protection for the operator. Finally, these complex methods require precise control of their parameters. As far as electropolishing baths are concerned, these are also difficult to manage because they are very hygroscopic and periodic dehydration steps are needed.

"Chemical" polishing methods consisting of immersing the component to be treated in a bath, or "chemical polishing bath", containing acidic or basic compounds together with oxidizing agents, are simpler to implement and do not require the application of an electric current or a laser.

Two examples of polishing baths for aluminum components are described in the article "Chemical polishing of aluminium coupons in support of vacuum chambers" by Skubal, L. R. and Walters, D. R., in Vacuum, Elsevier Ltd, [2013]96, pp. 1-6. DOI: 10.1016/j.vacuum.2013.03.002. The first bath comprises 50 mL of nitric acid, 250 mL of sulfuric acid and phosphoric acid, and 3 g of nickel sulfate. The second bath comprises 60 mL of nitric acid, 750 mL of sulfuric acid and 160 mL of phosphoric acid, and 2.5 g of copper nitrate.

Other chemical polishing baths are known from the article "Le polissage chimique de l'aluminium et de ses alliages" [Chemical polishing of aluminum and its alloys] by J. HERENGUEL and R. SECOND, REVUE DE METALLURGIE. XLVIII. No. 4. 1951, pp. 1-5. The polishing solutions proposed contain 80 to 95% by weight of phosphoric and sulfuric acids, with 3 to 10% by weight of nitric acid, at temperatures of between 85 and 120° C. The surface state obtained is excellent, but the processing times are very short, from 30 s to 1 min.

U.S. Pat. No. 3,425,881 describes a solution described as polishing, but which is closer to 'brightening', that is to say where the objective is to smooth bumps and achieve a shiny result. The bath comprises sulfuric and phosphoric acids, nitric acid, copper, ammonia and aluminum.

SUMMARY

The disclosure provides a polishing bath for aluminum components which makes it possible to obtain a surface with a mean roughness (Ra) of less than 5 μm and limited material removal, typically of less than 300 μm.

With this object in mind, the present disclosure relates to a chemical polishing bath for aluminum and aluminum alloy components, and to a method using such a bath.

The objective of chemical polishing is to reduce the surface roughness of a metallic component by carrying out selective dissolution of a layer of material of variable thickness, which may range from around ten nanometers to a plurality of tens of micrometers. This removal of material is performed chemically, using reagents which may be acidic or basic in nature, but also have oxidizing properties. It should be noted that the dissolution caused by the chemical polishing method has a direct impact on the dimensional aspect of the component even if this is not the objective sought, something which distinguishes it from the chemical machining method, the sole objective of which is to reduce the dimensions of the component (by several tens or hundreds of microns), so as to achieve a target value.

The principle of chemical polishing is also different from that of chemical pickling, which is closer to a chemical machining method. This is because the objective of chemical pickling is to remove an oxide layer, the thickness of which is of the order of a few microns, without impacting the dimensional features of the component and its surface roughness but promoting adhesion of the subsequently applied surface treatment.

A difference may also be noted relative to the chemical degreasing/decontamination steps aimed at solubilizing any chemical species adsorbed on the surface of the material to be treated. No impact on the dimensional characteristics of the component is observed in this latter case.

Thus, in the present text, polishing is taken to mean decreasing the surface roughness of a component while modifying its dimensions as little as possible.

According to the disclosure, a chemical polishing bath for polishing an aluminum or aluminum alloy component, or a part thereof, comprises:

- an oxidizing agent capable of attacking aluminum, selected from a list comprising nitric acid, hydrogen peroxide, permanganate, or one of the mixtures thereof, at a concentration of between 1.2 and 3.0 mol/L, preferably between 1.3 and 2 mol/L, and still more preferably between 1.4 and 1.6 mol/L;
- a fluoride complexing agent capable of forming a complex with oxidized aluminum at a concentration of between 0.3 and 1.6 mol/L;
- a catalyst, in particular copper; and
- phosphoric acid at a concentration of between 10.10 and 14.30 mol/L (namely between 1000 and 1400 g/L) together with sulfuric acid at a concentration of between 1.50 and 3.60 mol/L (namely between 150 and 350 g/L).

One of the advantages of the disclosure is to have identified the compounds, and their respective concentrations, which allow roughness to be significantly diminished, without significantly increasing size reduction, whereas these two effects generally require incompatible parameters.

The solution according to the disclosure comprises an oxidizing agent, which will attack the surface of the aluminum component, and an aluminum oxide complexing agent. The density of the bath is controlled by the mixture of sulfuric acid and phosphoric acid. This is because, in order to obtain a polishing effect, the present bath has a viscosity, or density, generally greater than that of other solutions used for chemical attack, for example those of the chemical machining type. Thus, the agressivity of the present solution is different from conventional chemical pickling or machining solutions, despite the use of reagents which may be similar. The two acids used (sulfuric acid and phosphoric acid) do, however, also have an attacking function when it comes to the surface of the aluminum, a metal which is highly soluble in an acidic medium. The arrival of the $H^+$ ions, originating from these two acids, close to the surface to be polished is also limited by the diffusion thereof, which makes it possible to control their attacking function.

The greater viscosity of the polishing solution makes it possible to slow down the diffusion phenomena of the chemical species of the solution toward the surface of the component where they are consumed. The objective is to make diffusion slower than the reaction kinetics. The attacking agents (oxidizing agent, sulfuric acid or phosphoric acid) and complexing agents are thus depleted at the surface, because they are consumed faster than they can arrive at the surface. They therefore arrive first of all close to the summits of the reliefs of the surfaces to be polished, where their action will predominate, whereas the troughs will not see as many reagents (attacking and complexing agents), as these will already have been consumed by a reaction at the points of the component most in relief. This phenomenon is thus responsible for a surface polishing effect achieved by selective dissolution of the rough surface areas.

In the context of the disclosure, speaking of an increase in the viscosity of the bath is equivalent to speaking of an increase in its density, and vice versa.

As the disclosure is currently understood, the efficacy of the present chemical polishing bath lies in control of the diffusion kinetics of the oxidizing agents and the complexing agents within the bath toward the surface of the component to be polished, together with the reaction kinetics of the oxidizing agents with the surface of the component to be polished. The principle of action of the chemical polishing bath according to the disclosure is as follows. An appropriate viscosity of the chemical polishing bath (increased relative to conventional chemical attack baths) makes it possible to slow down the diffusion phenomena of the active chemical species (here the oxidizing agents and complexing agents) of the solution toward the surface of the component. In the vicinity of the surface, the active species are consumed, which brings about local depletion of the bath. In order to re-establish equilibrium of the concentrations, the active species diffuse from the bath toward the surface, and in so doing they react as soon as they enter into contact with the surface to be polished. The most accessible zones being the summits of the peaks causing the surface roughness, attack of these summits is favored, so enabling the surface relief, and therefore the overall roughness of the component, to be reduced.

Initial tests were performed with the present polishing bath, for bath volumes of between 100 mL and 6 L, and proved effective. The chemical polishing bath according to the disclosure was developed in particular for polishing components resulting from additive manufacturing methods, but may be applied to all sorts of aluminum or aluminum alloy components, whatever the obtainment method. Furthermore, the dimensions and/or geometries may be very varied. Moreover, the aluminum component to be treated may be part of an element. That is to say, the aluminum component to be treated may be combined with another material, against which it is juxtaposed or on which it is superposed.

Advantageously, the fluorinated complexing agent added to the chemical polishing bath is selected from among $NH_4F \cdot HF$, $NaF \cdot HF$, $KF \cdot HF$, $SiF_6$ or mixtures thereof. The role of the fluoride complexing agent in the disclosure is to combine with the oxidized aluminum ($Al_2O_3$, $AlO[OH]$ or $Al(OH)_3$) which forms at the surface of the component under attack from the oxidizing agent, or which may be in solution.

Preferred inorganic complexing agents take the form of a fluorinated salt and hydrofluoric acid. In other words, they are a weak acid in the presence of the anion thereof, the fluoride ion or F'. Thus, the complexing agent used also acts as a buffer, which makes it possible to control the pH of the chemical polishing bath.

Furthermore, the fluoride ions (or $F^-$) are capable of complexing a variety of metals, which is of interest in the case of aluminum alloy components. Moreover, fluorides are complexing agents which are extremely stable in solution, and the risk are their breaking down over time and forming poorly controlled secondary products is minimal.

According to the variants, the fluoride complexing agent is present at a concentration of between 0.6 and 1.2 mol/L, preferably between 0.8 and 1.1 mol/L.

According to the variants, the oxidizing agent is present at a concentration of between 1.3 and 2 mol/L, preferably between 1.4 and 1.6 mol/L.

According to the variants, the phosphoric acid is present at a concentration of between 11 and 13 mol/L, preferably between 11.5 and 12 mol/L, and/or the sulfuric acid at a concentration of between 1.6 and 3 mol/L, preferably between 1.7 and 2.2 mol/L.

The copper is generally introduced into the polishing bath in the form of soluble salt in order to promote dispersion of the copper and a homogeneous concentration of copper in the bath. This is because the copper is added to the chemical polishing bath due to its catalyzing the oxidation of the surface of the aluminum or aluminum alloy component to be polished. Being a catalyst, very little is consumed because it is regenerated after it has reacted with the substrate by the action of the nitric acid.

The copper salt added is preferably selected from the group consisting of copper sulfate, copper nitrate or a mixture thereof. Advantageously, the copper is added to the polishing bath in the form of copper sulfate, because the sulfate ions associated with the copper are already present in said polishing bath due to the use of sulfuric acid, which reduces the risk of a parasitic reaction associated with the introduction of other elements into the reaction medium. The copper is preferably present in an amount of 0.10 to 0.20 mol/L.

During use thereof, the polishing bath becomes charged with dissolved aluminum, due to the chemical attack acting on the surface roughness. It is possible to regenerate such a bath after use by simple addition of the compounds consumed during polishing, in particular the oxidizing agents and complexing agents, and in this case the regenerated bath still contains aluminum, which is also the case for traditional chemical polishing baths. However, traditional baths are destroyed when the concentration of aluminum becomes too high. This is because the presence of aluminum may disturb operation of the bath, and impair polishing performance, which translates in particular into slowing of the reaction kinetics, which could have a negative effect on the polishing principle, and competition with the diffusion of the reagents (oxidizing agents and complexing agents). It is therefore preferable to define admissible aluminum concentration limits which do not impair the chemical polishing mechanism. Advantageously, the aluminum is present at a concentration ranging from approximately 1 to 50 g/L, namely between 0.037 and 1.85 mol/L, preferably at a concentration of ranging from approximately 1 to 30 g/L, namely between 0.037 and 1.1 mol/L. Since these aluminum concentrations are lower than what is conventionally observed for a chemical pickling bath for example, the bath used here is therefore definitely a polishing bath.

Depending on the variants, the bath has a density of from 1.6 to 1.8 g/cm$^3$.

In the context of the disclosure, the above-mentioned concentration ranges should be understood in the broadest possible sense, i.e. including the upper and lower limit values of said concentration ranges. The term "approximately" is used in the present text to signify a range of values of ±10% of the value indicated.

In another aspect, the disclosure proposes a chemical polishing method for an aluminum or aluminum alloy component, or a part thereof using the chemical polishing bath as described above.

The method according to the disclosure comprises at least the following steps:
providing a chemical polishing bath as described above;
immersing an aluminum or aluminum alloy component to be polished, or a part thereof, in the chemical polishing bath;
removing the component from the bath after a predetermined immersion time.

In order to control the concentration of reagents, in particular oxidizing agent and complexing agent, in the polishing bath, these concentrations may be determined by assay. The different chemical species may be assayed by acid-base titration in a non-aqueous medium, by thermometric titration or by spectrophotometry. Alternatively, the various reagents may also be assayed by ionic chromatography or by inductively coupled plasma atomic emission spectrometry (ICP-AES).

The temperature of the polishing bath on immersion of the component to be polished is between 70° C. and 100° C., preferably between 80° C. and 90° C. The immersion time of the aluminum or aluminum alloy component in the polishing bath is between 5 and 15 minutes, preferably between 7 and 12 minutes and still more preferably the immersion time is equal to 10 minutes. The temperature of the bath influences the reaction kinetics of the polishing method, and in particular the speed of attack of the aluminum. The higher the temperature, the faster the action of the attacking agents (oxidizing agent, sulfuric acid or phosphoric acid) and complexing agents. The difference between the reaction rate of the reagents and the diffusion thereof is accentuated, which improves the polishing method and the results obtained, i.e. a decrease in surface roughness while limiting size reduction.

Thanks to the method according to the disclosure using the polishing bath at a certain temperature and by immersing the component or the part thereof to be polished for a particular period, the surface roughness of the component can be significantly diminished without any great increase in size reduction. These two effects generally entail antagonistic parameters: immersing an aluminum or aluminum alloy component longer in the polishing bath makes it possible to promote the decrease in roughness but increases the size reduction. Surprisingly, applying an immersion time of 10 minutes makes it possible to achieve an arithmetic mean residual roughness, or height, along a line (Ra) of less than 5 µm, and even of less than 3 or 2 µm, while limiting the size reduction to around one hundred micrometers. In other words, in the present context, the size reduction observed for a component polished with the assistance of a chemical polishing bath or a chemical polishing method according to the disclosure amounts to a size reduction of less than 300 µm. The parameter Sa may be considered more relevant than Ra when it comes to quantifying the roughness, or a decrease in roughness, of a surface because said parameter is an arithmetic mean roughness measured over a surface and not just along a line like Ra. The aluminum or aluminum alloy components polished with the assistance of a chemical polishing bath according to the disclosure advantageously have an Sa of the order of 1 µm.

In the present text, the expression "of the order of 1 µm" means between 1 and 5 µm.

Advantageously, a chemical degreasing and/or pickling step may be performed on the surface of the component to be polished prior to the step of immersing said component or the part thereof to be polished in the chemical polishing bath. Such a surface preparation step makes it possible to clean the surface and in particular to facilitate access thereto by the oxidizing and/or complexing agents reacting with said surface during the chemical polishing process, increasing the effectiveness thereof.

The chemical polishing bath according to the disclosure or the method using such a bath, are particularly well suited to aluminum alloys.

The present chemical polishing bath together with the present polishing method were in particular developed for aluminum alloys belonging to the 10000 to 70000 series, in particular to the 40000 alloy family, more particularly the aluminum alloy is alloy AS7G06 of type 42200. As is known in the field, these alloys are particularly difficult to polish due to their elevated silicon (Si) content; however, they are widely used in the automotive industry, which increases the interest in developing such a chemical polishing bath.

Advantageously, the part to be polished in whole or in part by means of a chemical polishing bath according to the disclosure or of the method using such a bath is an aluminum or aluminum alloy component obtained by an additive manufacturing, or 3D printing, method.

Accordingly, the present chemical polishing bath or the present chemical polishing method is in particular applied to the treatment of components produced for the aerospace, aeronautical and automotive industries, in order to eliminate surface irregularities and thus prevent the risk of particles becoming separated from the surface of said components in service, which could give rise to functional problems in connection with their use, such as pipework blockages or a decrease in their static and/or dynamic mechanical properties.

BRIEF DESCRIPTION OF THE FIGURES

Other details and features of the disclosure will emerge from the following detailed description of at least one advantageous embodiment, provided below by way of illustration with reference to the appended drawings, in which:

FIG. 1 shows diagrams representing (points 1 to 6 of) the principle of operation of the present method;

FIG. 2 shows confocal micrographs comparing the surface state of an AS7G06 aluminum alloy component before (a) and after (b) chemical polishing using a first preferred embodiment of a chemical polishing bath according to the disclosure; and FIG. 3 shows confocal micrographs comparing the surface state of an AS7G06 aluminum alloy component before (a) and after (b) chemical polishing using a second preferred embodiment of a chemical polishing bath according to the disclosure.

DETAILED DESCRIPTION OF THE FIGURES WITH REFERENCE TO EXAMPLES

The principle of operation of the polishing bath according to the disclosure will firstly be explained with reference to FIG. 1. As explained previously, the present disclosure surprisingly proposes a polishing bath which allows roughness to be significantly diminished, without increasing size reduction, whereas these two effects generally entail antagonistic parameters.

The increased viscosity of the bath, which is controlled by the sulfuric and phosphoric acid, makes it possible to slow the diffusion phenomena of the chemical species of the solution toward the surface of the component. This depletion of active species on the surface, due to their being consumed in the vicinity of the surface, is responsible for a surface polishing effect by selective dissolution of the surface relief.

The principle is shown in FIG. 1:
1): attack and oxidation of the material by the oxidizer and formation of a first passivation layer (metal oxides from aluminum and alloy elements);
2, 3): complexation of the aluminum and alloy oxides by the complexing agents to solubilize the oxides;
4, 5): slow diffusion of the oxidizing compounds from the solution toward the surface of the alloy to be polished, the sulfuric acid and phosphoric acid making it possible to slow the arrival of the oxidizing compounds;
6): attack of the upper parts of the relief, bringing about the reduction in roughness.

EXAMPLES

Two examples of polishing aluminum components in two different baths, baths 1 and 2, according to the disclosure, together with two examples of treating aluminum components in two different baths, baths 3 and 4, not in accordance with the disclosure (comparative examples).

Four AS7G06 aluminum alloy components denoted A to D resulting from the same additive manufacturing method take the form of a plate of dimensions 60×40×6 mm. The upper face is the face on which the layers of material are added one after the other during the manufacturing method, while the lower face is the opposite face. The plates were first subjected to a chemical degreasing and pickling step with nitric acid in order to prepare their surface using conventional methods familiar to a person skilled in the art. The four components A to D were then each partially covered with a self-adhesive masking tape.

The resultant partially masked aluminum alloy components A and B were then subjected to chemical polishing methods using polishing baths of different compositions, denoted 1 and 2, according to two preferred but non-limiting embodiments of the disclosure. The resultant partially masked aluminum alloy components C and D were then subjected to chemical polishing methods using comparative polishing baths of different compositions, denoted 3 and 4, which were not according to the disclosure. The four different baths 1 to 4 were prepared in similar tanks with solution volumes of 4 L, their compositions are set out in Table 1.

TABLE 1

| Sample | $H_2SO_4$ g/L | $H_3PO_4$ g/L | $HNO_3$ g/L | Aluminum g/L | $NH_4F \cdot HF$ g/L | $CuSO_4 \cdot 5H_2O$ g/L | T °C. | Duration min |
|---|---|---|---|---|---|---|---|---|
| Bath 1 | 180 | 1140 | 100 | 10 | 50 | 25 | 85 | 10 |
| Bath 2 | 300 | 1140 | 100 | 20 | 50 | 50 | 85 | 10 |
| Bath 3 | 180 | 950 | 100 | 10 | 100 | 25 | 85 | 10 |
| Bath 4 | 300 | 1140 | 100 | 10 | 100 | 50 | 85 | 10 |
| Bath 1 | 1.88 | 11.6 | 1.55 | 0.37 | 0.88 | 0.10 | 85 | 10 |
| Bath 2 | 3.06 | 11.6 | 1.55 | 0.74 | 0.88 | 0.20 | 85 | 10 |
| Bath 3 | 1.88 | 10.0 | 1.55 | 0.37 | 1.76 | 0.10 | 85 | 10 |
| Bath 4 | 3.06 | 11.6 | 1.55 | 0.37 | 1.76 | 0.20 | 85 | 10 |

Aluminum alloy component A was immersed in bath 1, component B in bath 2, component C in bath 3 and component D in bath 4. For each of the components, the zone covered by the self-adhesive masking tape is not in direct contact with the bath in which the component is immersed and does not undergo any change in its surface state.

For the purposes of the present disclosure, since the elevated viscosity of the polishing bath (typically a density of 1.6 to 1.8 g/cm$^3$) and the local non-uniformities in concentration (due to the thickness of the diffusion layer) of oxidizing agent and complexing agent are crucial to controlling polishing and promoting chemical attack of the peaks, agitation of the bath when the component to be treated is immersed therein is strictly controlled. The bath is preferably agitated at a lower agitation rate when the component to be polished is immersed (treatment phase) than during preparation of the polishing bath (homogenization phase). This agitation rate is typically between 5 and 10 L/min during the treatment phase and around 100 L/min during homogenization phases. These agitation rate values are given solely by way of example and do not limit the present disclosure. In particular, since the agitation rate influences the renewal of chemical species present in the liquid layer, known as the diffusion layer, in the vicinity of the component to be treated, a lower agitation rate enables the formation of a thicker diffusion layer, which slows the diffusion of reactants and promotes polishing.

After immersion in the polishing bath, the treated component was rinsed and then observed under a confocal microscope in order to determine the decrease in its roughness and its size reduction. In particular, for each of the components, the self-adhesive masking tape was removed and a zone comprising a treated surface and an untreated surface (because it had previously been masked by the self-adhesive masking tape) was observed using an Olympus DSX510 microscope. The topography of each of the surfaces was recorded and analyzed in order to determine the size reduction due to material removal and the variations in roughness parameters due to the polishing effect of the different baths.

Table 2 shows the surface roughnesses obtained after manufacture (untreated surface) and resulting from the chemical polishing (treated surface) for aluminum alloy components A to D, together with the size reduction of the components which has taken place during this polishing. In said table, the expression before polishing refers to the part of the surface which was masked by the self-adhesive masking tape during immersion in the bath, while the expression after polishing refers to the portion of the surface which was not masked by the tape and was subjected to the chemical polishing treatment.

As is apparent from Table 2 together with FIG. 2a and FIG. 3a, components A to D obtained by the additive manufacturing method have a similar surface state before polishing.

After polishing, components A to D have all undergone a size reduction on each of their faces (Table 2). FIG. 2b and FIG. 3b together with Table 2 show a great decrease in the surface relief of the components treated with the two baths according to the disclosure, and therefore polishing of components A and B. It should be noted that, among the two components treated with a bath according to the disclosure, component B exhibits a greater size reduction than component A (Table 2), which may be linked to a doubling of catalyst concentration between bath 2 and bath 1. This is because the catalyst promotes chemical attack and therefore size reduction.

TABLE 2

| Components treated with a bath according to the disclosure | Component A - upper face | | Component A - lower face | | Component B - upper face | | Component B - lower face | |
|---|---|---|---|---|---|---|---|---|
| | Before polishing | After polishing | Before polishing | After polishing | Before polishing | After polishing | Before polishing | After polishing |
| Ra μm | 22.65 | 0.99 | 18.11 | 1.13 | 19.22 | 2.17 | 19.31 | 2.75 |
| Rz μm | 151.47 | 5.9 | 137.74 | 6.83 | 124.88 | 15.35 | 117.12 | 20.69 |
| Sa μm | 17.10 | 1.21 | 15.17 | 1.40 | 18.42 | 1.72 | 17.20 | 2.03 |
| Size reduction μm | 187.4 | | 174.9 | | 283.1 | | 234.7 | |

| Components treated with a comparative bath | Component C - upper face | | Component C - lower face | | Component D - upper face | | Component D - lower face | |
|---|---|---|---|---|---|---|---|---|
| | Before polishing | After polishing | Before polishing | After polishing | Before polishing | After polishing | Before polishing | After polishing |
| Ra μm | 18.55 | 7.58 | 17.93 | 6.66 | 23.90 | 37.77 | 19.70 | 28.32 |
| Rz μm | 179.37 | 43.73 | 144.93 | 48.70 | 156.80 | 220.42 | 170.56 | 186.74 |
| Sa μm | 18.01 | 4.22 | 14.52 | 4.17 | 19.86 | 29.07 | 17.02 | 25.35 |
| Size reduction μm | 397 | | 314 | | 70.6 | | 9.3 | |

A comparison of the results obtained with bath 2 (according to the disclosure) and with bath 4 (comparative example) reveals that increasing the concentration of complexing agent enables a significant decrease in size reduction. Said size reduction is indeed only 9.3 μm for the lower face of component D as compared to 234.7 μm for the lower face of component B. However, the surface roughness of component D has not decreased during processing in bath 4 and is on the contrary higher after treatment than it was before treatment (Table 2). There is no polishing effect.

A comparison of the results obtained with bath 1 (according to the disclosure) and with bath 3 (comparative example) reveals that increasing the concentration of complexing agent while decreasing the concentration of phosphoric acid enables a significant decrease in the surface roughness of the treated component (Table 2). However, the size reduction of each of the faces of component C treated with bath 3 (comparative example) is almost twice that of the faces of component A treated with bath 1 (according to the disclosure). Bath 3 is a chemical machining bath and not a chemical polishing bath.

The invention claimed is:

1. A chemical polishing bath for polishing an aluminum or aluminum alloy component, or a part thereof, said chemical polishing bath comprising:
    an oxidizing agent capable of attacking aluminum selected from nitric acid, hydrogen peroxide, permanganate, or one of the mixtures thereof, at a concentration of between 1.2 and 3.0 mol/L;
    a fluoride complexing agent capable of forming a complex with oxidized aluminum at a concentration of between 0.3 and 1.6 mol/L;
    a catalyst; and
    phosphoric acid at a concentration of between 10.10 and 14.30 mol/L together with sulfuric acid at a concentration of between 1.50 and 3.60 mol/L.

2. The chemical polishing bath as claimed in claim 1, wherein the fluoride complexing agent is added to the bath in the form of $NH_4F \cdot HF$, $NaF \cdot HF$, $KF \cdot HF$, $SiF_6$ or mixtures thereof.

3. The chemical polishing bath as claimed in claim 1, wherein the fluoride complexing agent is present at a concentration of between 0.6 and 1.2 mol/L.

4. The chemical polishing bath as claimed in claim 3, wherein the fluoride complexing agent is present at a concentration of between 0.8 and 1.1 mol/L.

5. The chemical polishing bath as claimed in claim 1, wherein the oxidizing agent is present at a concentration of between 1.3 and 2 mol/L.

6. The chemical polishing bath as claimed in claim 5, wherein the oxidizing agent is present at a concentration of between 1.4 and 1.6 mol/L.

7. The chemical polishing bath as claimed in claim 1, wherein the phosphoric acid is present at a concentration of between 11 and 13 mol/L, and/or the sulfuric acid at a concentration of between 1.6 and 3 mol/L.

8. The chemical polishing bath as claimed in claim 7, wherein the phosphoric acid is present at a concentration of between 11.5 and 12 mol/L, and/or the sulfuric acid at a concentration of between 1.7 and 2.2 mol/L.

9. The chemical polishing bath as claimed in claim 1, wherein the catalyst is copper and copper is present in an amount of 0.10 to 0.20 mol/L.

10. The chemical polishing bath as claimed in claim 9, wherein copper is added to the bath in the form of a copper salt, the copper salt being selected from a group composed of copper sulfate, copper nitrate or mixtures thereof.

11. The chemical polishing bath as claimed in claim 1 comprising aluminum, present at a concentration ranging from 1 to 50 g/L, namely between 0.037 and 1.85 mol/L.

12. The chemical polishing bath as claimed in claim 11, wherein aluminum is present at a concentration ranging from 1 to 30 g/L, namely between 0.037 and 1.1 mol/L.

13. The chemical polishing bath as claimed in claim 1, said bath having a density of from 1.6 to 1.8 g/cm$^3$.

14. A chemical polishing method for polishing an aluminum or aluminum alloy component, or a part thereof, the method including the following steps:
    (i) providing a chemical polishing bath as claimed in claim 1,
    (ii) immersing an aluminum or aluminum alloy component to be polished, or a part thereof in the chemical polishing bath, and;
    (iii) removing the component after a predetermined immersion time.

15. The chemical polishing method as claimed in claim 14, wherein the immersion time is between 5 and 15 minutes.

16. The chemical polishing method as claimed in claim 15, wherein the immersion time is between 7 and 12 minutes.

17. The chemical polishing method as claimed in claim 14, wherein the bath is agitated during the immersion.

18. The chemical polishing method as claimed in claim 17, wherein the bath is agitated at an agitation rate of between 5 and 10 L/min, during the immersion.

19. The chemical polishing method as claimed in claim 14, wherein the aluminum or aluminum alloy component, or the part thereof, to be polished is subjected to a chemical degreasing and/or pickling step before being immersed in the chemical polishing bath.

20. The chemical polishing method as claimed in claim 14, wherein the component to be polished, or the part thereof, is made of aluminum alloy belonging to the 10000 to 70000 series.

21. The chemical polishing method as claimed in claim 14, wherein the aluminum or aluminum alloy component to be polished is obtained by an additive manufacturing method.

22. The chemical polishing method as claimed in claim 14, wherein the chemical polishing bath is maintained at a temperature of between 70° C. and 100° C.

* * * * *